Figure 1:
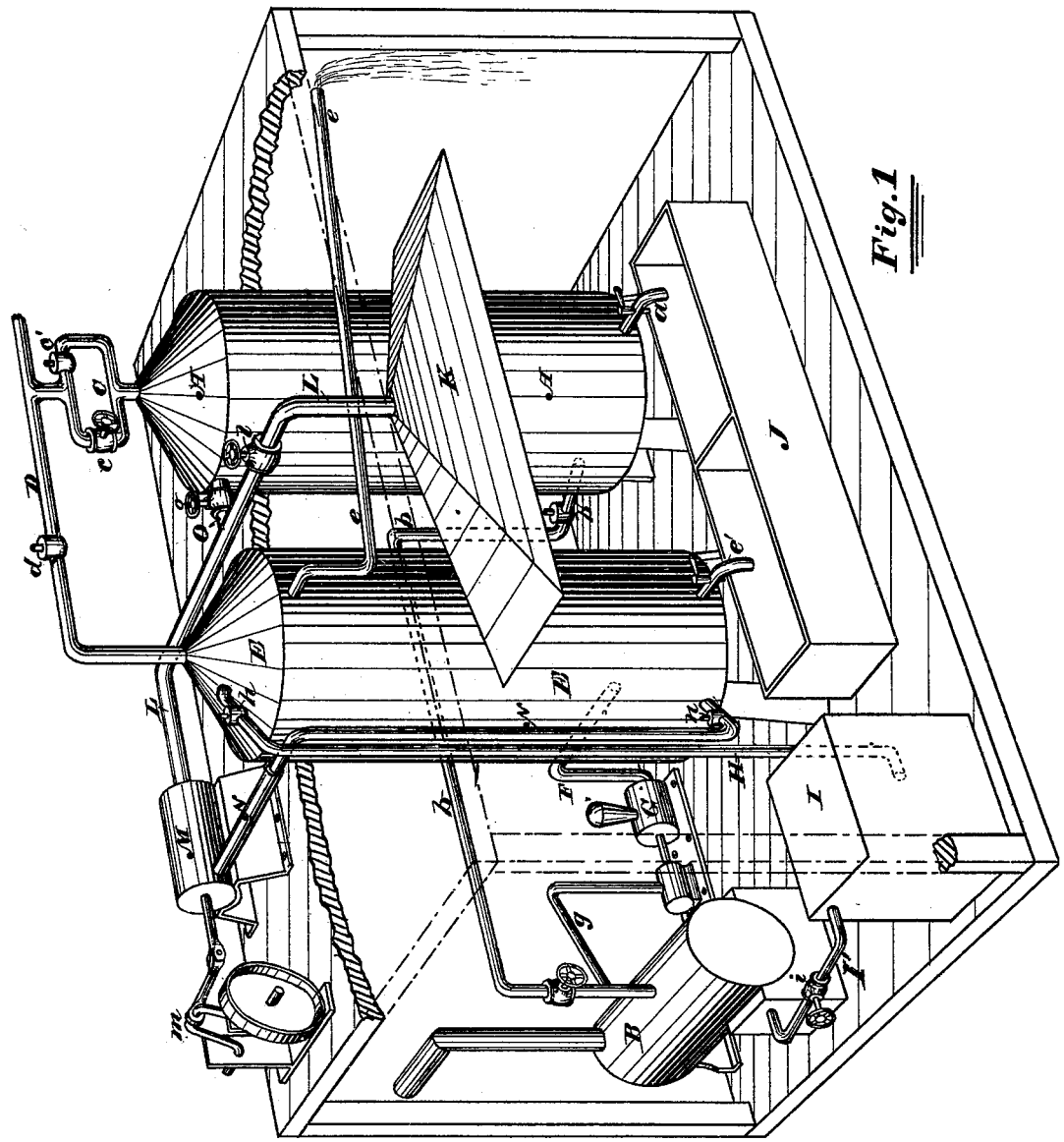

2 Sheets—Sheet 1.

D. WARD.
PROCESS AND APPARATUS FOR TREATING RENDERING TANK GASES.

No. 185,846. Patented Jan. 2, 1877.

Attest
Wm. F. Baker
L. M. Harris

Inventor
Dennis Ward
By Coburn & Thacher
Attorneys.

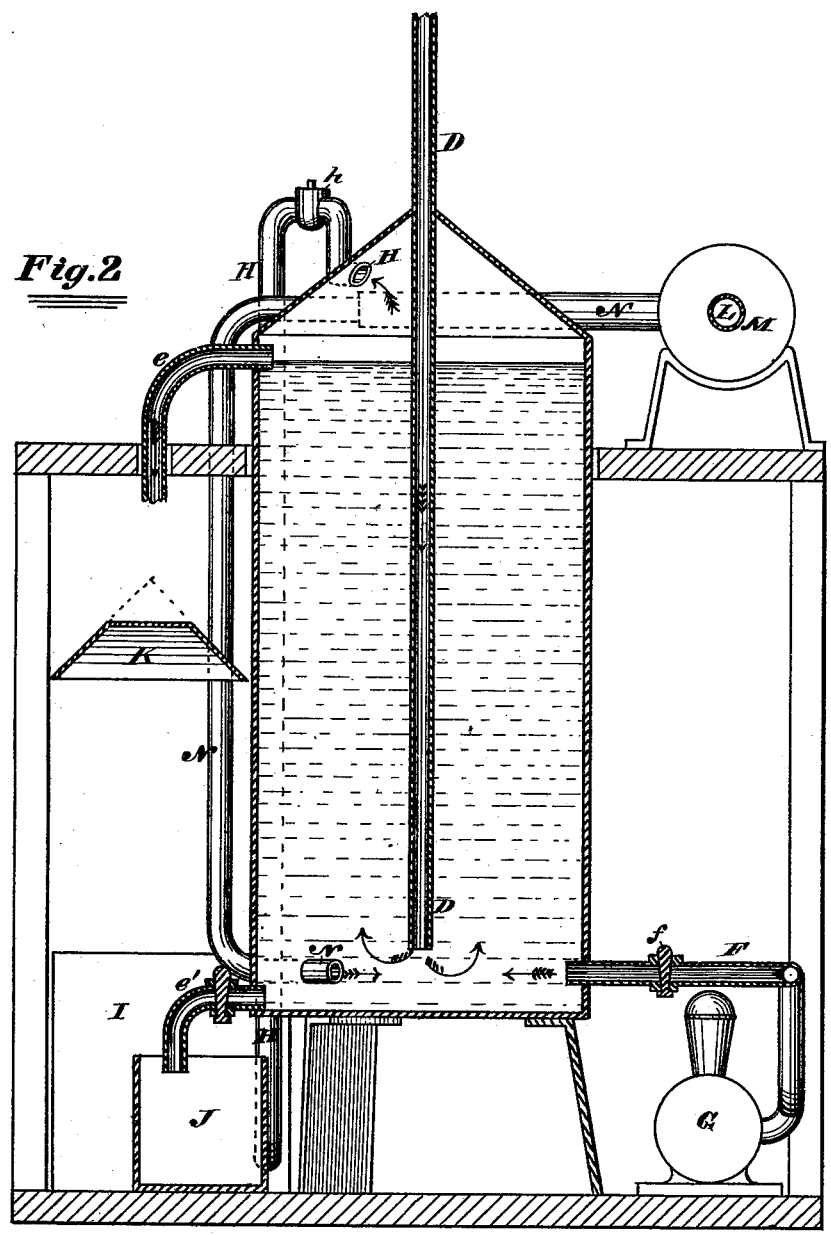

UNITED STATES PATENT OFFICE.

DENNIS WARD, OF CHICAGO, ILLINOIS.

IMPROVEMENT IN PROCESSES AND APPARATUS FOR TREATING RENDERING-TANK GASES.

Specification forming part of Letters Patent No. 185,846, dated January 2, 1877; application filed November 13, 1876.

*To all whom it may concern:*

Be it known that I, DENNIS WARD, of Chicago, in the county of Cook and State of Illinois, have invented a new and useful Improvement in a Process and Apparatus for Treating Rendering-Tank Gases, which is fully described in the following specification, reference being had to the accompanying drawings, in which—

Figure 1 represents a perspective view of my improved apparatus; and Fig. 2, a transverse vertical section.

The object of my invention is to collect all the offensive gases which are generated in rendering establishments and works for the treatment of offal and animal substances of all kinds, and treating them in such a manner as to entirely suppress all offensive and unhealthy odors, and at the same time provide a gas which may be used for heating and illuminating purposes.

The invention consists in an improved method of separating the gases from the steam as they are conducted from the rendering-tanks by admitting the mixed steam and gases directly into the lower portion of a body of flowing water. It further consists in the method of collecting the offensive gases outside of the rendering-tanks themselves and forcing them into the body of flowing water heretofore mentioned; and it further consists in sundry improvements in apparatus for collecting, separating, and distributing the gases, which will be hereinafter fully described.

In the drawings, A represents a rendering-tank, which may be of ordinary construction, and is supplied with steam in the usual manner from the boiler B, through a steam-pipe, b, which enters the bottom of the tank. This rendering-tank is provided with the usual cock a for drawing off the contents whenever desired. A pipe, C, is fitted to the top of the tank A, and connects with a main conducting-pipe, D.

The pipe C is made branching, as shown in Fig. 1 of the drawings, and in one branch is placed a stop-cock, c, and in the other a check-valve, c'. The pipe D leads to a tank, E, which it enters at the top and passes down through it nearly to the bottom, as shown in Fig. 2 of the drawings. The pipe D is provided with a check-valve, d, located between the two tanks, so as to prevent any back flow of gas from the tank E. This latter tank E is nearly filled with water, which is forced into the bottom of the tank through a pipe, F, by means of a force-pump, G, which may be operated by steam taken by the pipe g from the boiler, or by any other power which it may be convenient to employ.

The feed-pipe F is provided with a stop-cock, f, by means of which the flow of water into the tank E may be stopped whenever desired. The said tank E is also provided with an outlet-pipe, e, which is inserted near the top of the tank, and is led off to discharge the water whenever desired.

It will be seen that by the operation of the force-pump G and the outlet-pipe e the water in the tank E is continually changing; or, in other words, there is a current through the tank, so that the latter is kept constantly supplied with fresh water.

An ordinary cock, e', is also inserted in the bottom of the tank E, so that, whenever desired, the water in the latter may be entirely drawn off. A pipe, H, is inserted in the top of the tank E above the water-line, and leads to a gasometer and carbureter, I, into the bottom of which it opens. This pipe is provided with a check-valve, h, to prevent the back flow of gas from the gasometer, and from the latter a pipe, I', may lead directly to the fire-box of the furnace when it is desired to use the gas for heating purposes, the said pipe being provided with a stop-cock, i, to regulate the flow of gas to the furnace. At the foot of the tanks A and E is a receptacle, J, divided into compartments to receive the contents of either of the tanks when drawn off.

More or less steam and gas will escape from the rendering-tanks whenever the contents are drawn off. For the purpose of collecting these vapors a hood, K, is placed above the receptacle J, and is attached to one end of a pipe, L, which leads to an exhaust and force pump, M, located in any convenient place in the building. This pump may be operated by a crank, m, driven by suitable mechanism, or by any other means which are adapted to this purpose, and is constructed so as to exhaust through the pipe L, and force out through a pipe, N, which is properly connected for this purpose with the pump M, and is conducted thence to the bottom of the water-tank E, into which it opens, so as to discharge into the bottom of the body of water in said tank.

The pipe L is provided with a stop-cock, $l$, near the hood K, and the pipe N is provided with a check-valve, $n$, to prevent the back flow of water or gas. The pipe L is also connected, by a pipe, O, with the top of the rendering-tank A, the said pipe being provided with a stop-cock, $o$, so that direct communication may be opened, whenever desired, between the upper portion of the rendering-tank and the exhaust and force pump M.

The operation of the above described apparatus is as follows: The pressure of the hot steam and gases generated in the rendering-tank A will force the mixed vapors in a current out through the pipe C, the stop-cock $c$ being used to regulate the discharge, and the check-valve $c'$ being employed to permit the escape of gas through the other branch of the pipe C whenever the pressure in the tank is suddenly increased, so that the flow through the stop-cock $c$ is not sufficient to conduct away the gases rapidly enough for safety. The current of mixed gas and steam is conducted thence along the pipe D to the bottom of the tank E, where it is discharged directly into the lower portion of the body of cold water contained therein. As soon as the mixed vapors are thus discharged into the body of cold water the steam will be condensed, while the permanent gases, entirely separated from the steam, will rise through the column of water, being washed thereby from certain impurities, and will be collected, in a pure gaseous form, in the upper part of the tank. Thence the unmixed gas flows, through the pipe H, directly to the gasometer I, which may also be made to perform the office of a carbureter, by placing therein any of the known devices and material for carbureting gases.

By the operation of the exhaust and force pump M all the steam and gases escaping from the tanks into the building will be drawn through the pipe L and forced into the bottom of the tank E through the pipe N, when the mixed vapors will be acted upon by the cold water in the same manner as described above.

The stream of water constantly forced into the bottom of the tank by means of the pump G will keep the lower portion of the column of water in a state of constant agitation, which greatly facilitates the separation of the gases from the steam, the condensation of the latter, and the washing of the former, as above described.

By keeping up a constant current of water through the tank E, as already described, the water is kept cold and pure, so that the outflowing current discharged from the pipe $e$ is almost entirely free from any disagreeable stench.

The exhaust current through the pipe L is, of course, only necessary when the works are in operation, and during this time the stop-cock $o$ should be closed, so as to prevent all communication between the pipe L and the rendering-tank. When, however, the work is stopped for the day, it is desirable to draw off all the steam and gas from the rendering-tanks. It is for this purpose that the rendering-tanks are connected with the exhaust-pipe L, and whenever the works are closed the stop-cock $o$ should be opened and the stop-cock $l$ closed, when it is evident the pump M will exhaust directly from the rendering-tank, and in this way soon discharge the vapors contained therein into the bottom of the water-tank E.

By the operation of these several devices I am enabled to collect and successfully dispose of all the offensive gases generated in and about rendering establishments and other works of a similar nature, so that the air about the establishment is pure and healthy, and the intolerable stench which pollutes the air and makes a rendering establishment ordinarily a nuisance to the surrounding neighborhood is entirely suppressed.

I have shown the gasometer connected directly with the furnace, which is desirable whenever the gas is to be employed for heating purposes only; but the gas thus obtained may also be employed for illuminating purposes. It must, however, when thus used, be carbureted in some suitable way, either in the receiver I or elsewhere, and, of course, a proper distributing-pipe should be connected to the receiver I for the purpose of feeding the gas to the burners.

In rendering establishments a series of tanks are generally used. It is obvious, however, that my process and apparatus can be applied without difficulty to the entire series, for it will only be necessary to connect each tank with the pipes D and L, as described, and extend the hood K along the entire row of tanks.

My process and apparatus are simple, cheap, and efficient. I have put them into actual use, and have found that they accomplish all which is herein claimed for them, and that their operation therefore is highly satisfactory and beneficial to the public in the abatement of what has heretofore been regarded as a nuisance, as well as utilizing products which have heretofore been entirely lost.

Having thus described my invention, what I claim as new, and desire to secure by Letters Patent, is—

1. The method herein described of treating the gases generated in steam rendering-tanks by passing the vapors directly from the tanks into the lower part of a column of running water, through which they then rise, thereby condensing all the watery vapors, taking up all the stench therefrom into the running water, and washing the gas, and conducting the gas thus obtained to a receiver or carbureter, whence it may be distributed for heating or illuminating purposes, substantially as set forth.

2. The method herein described of treating the gases arising outside of the tanks by collecting the vapors by means of suction and forcing them into the bottom of a tank of running water, through which they pass to separate the steam from the gas, which is then utilized for heating and illuminating, substantially as set forth.

3. The tank E, filled with water and provided with the overflow-pipe $e$, in combination with a force-pump, G, for producing a current through the tank, and the conducting-pipe D, connecting with the interior of the rendering-tanks and extending down within the water-tank nearly to the bottom thereof, substantially as and for the purpose set forth.

4. The rendering-tank A, in combination with the branching-pipe C, provided with the stop-cock $c$ and check-valve $c'$, and main conducting-pipe D, substantially as and for the purpose set forth.

5. The pipe L, having a hood, K, attached to its open end, in combination with the exhaust and force pump M, pipe N, and water-tank E, substantially as and for the purpose set forth.

6. The rendering-tank A, in combination with an exhaust and force pump, M, connected directly therewith by a suitable pipe, and a pipe, N, connecting said pump with the bottom of the water-tank E, substantially as and for the purpose set forth.

DENNIS WARD.

Witnesses:
L. A. BUNTING,
L. M. HARRIS.